United States Patent [19]
Schmidt

[11] Patent Number: 6,030,084
[45] Date of Patent: *Feb. 29, 2000

[54] COMBINATION MIRROR AND METHOD FOR PRODUCTION THEREOF

[76] Inventor: William P. Schmidt, 21000 Woodruff, Rockwood, Mich. 48173

[ * ] Notice: This patent issued on a continued prosecution application filed under 37 CFR 1.53(d), and is subject to the twenty year patent term provisions of 35 U.S.C. 154(a)(2).

[21] Appl. No.: 08/982,183

[22] Filed: Dec. 17, 1997

Related U.S. Application Data

[63] Continuation of application No. 08/594,698, Jan. 31, 1996, abandoned.

[51] Int. Cl.[7] .................................................. G02B 5/10
[52] U.S. Cl. .............................................................. 359/868
[58] Field of Search ..................................... 359/863, 864, 359/866, 868, 869, 872; 248/481

[56] References Cited

U.S. PATENT DOCUMENTS

| | | | |
|---|---|---|---|
| 4,449,786 | 5/1984 | McCord | 359/868 |
| 4,580,881 | 4/1986 | Kim | 359/868 |
| 4,613,107 | 9/1986 | Vitaloni | 248/481 |
| 5,109,301 | 4/1992 | Yang | 359/872 |

FOREIGN PATENT DOCUMENTS 55-51635  4/1980  Japan ................................. 359/868

*Primary Examiner*—Cassandra Spyrou
*Assistant Examiner*—Mark A. Robinson
*Attorney, Agent, or Firm*—Weintraub & Brady, P.C.

[57] ABSTRACT

A combination curved and flat mirror lens has a comparatively flatter top portion and a substantially convex or curved lower portion integrally formed to the top portion. The lens has a maximum radius of curvature at one end thereof continuously varying to a minimum radius of curvature at an opposite end. A method for forming such a mirror lens includes cutting such a lens out of a large sheet of curved mirror glass.

11 Claims, 3 Drawing Sheets

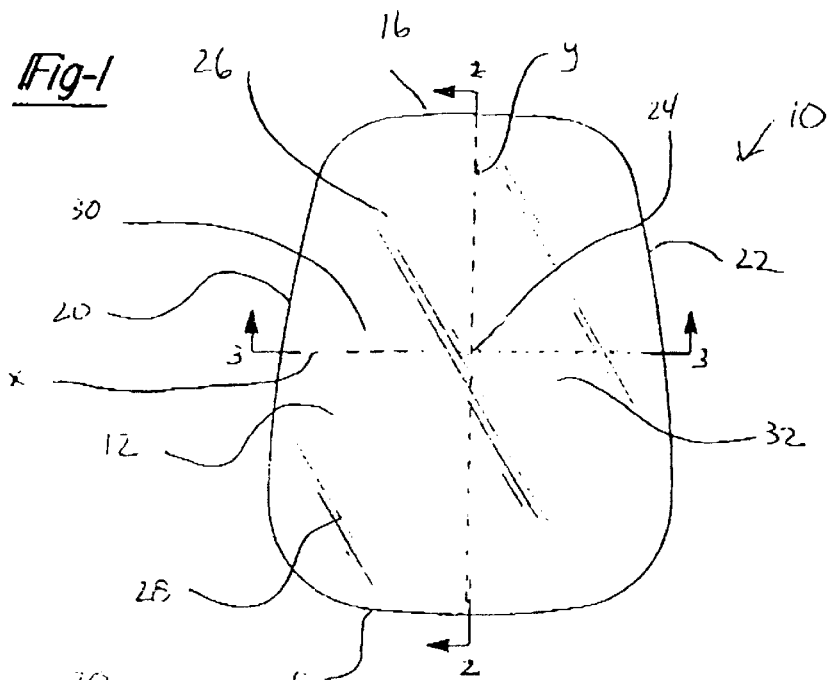
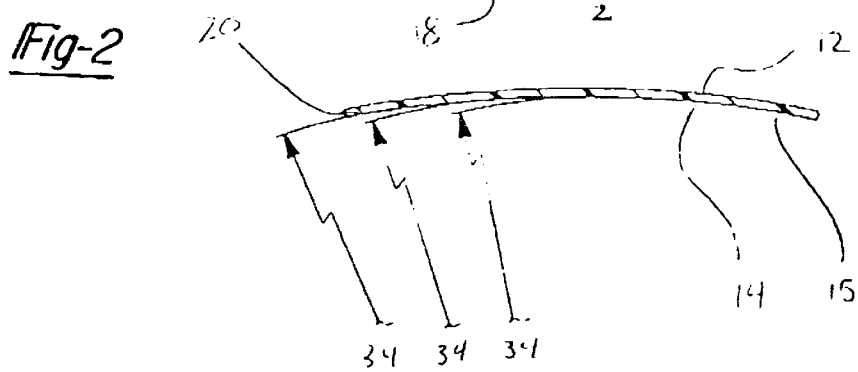
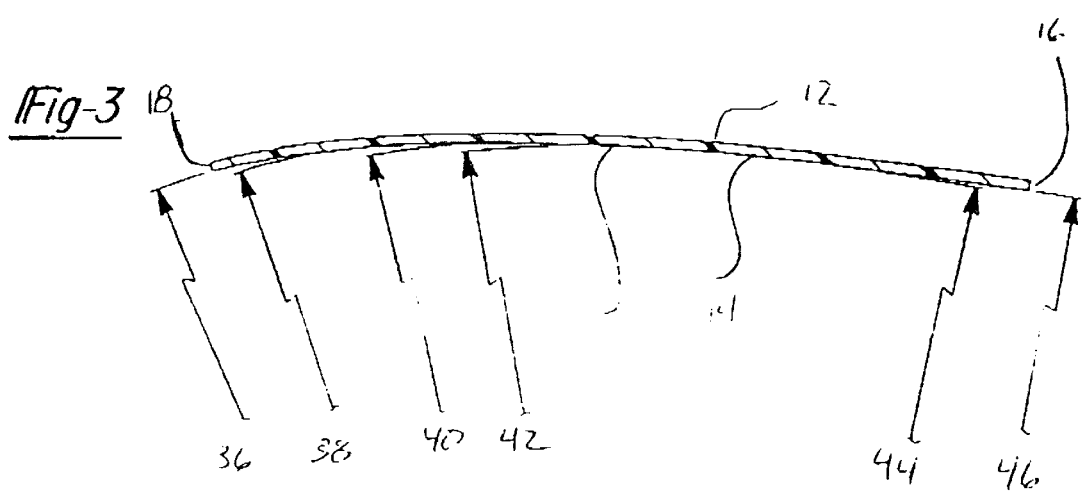

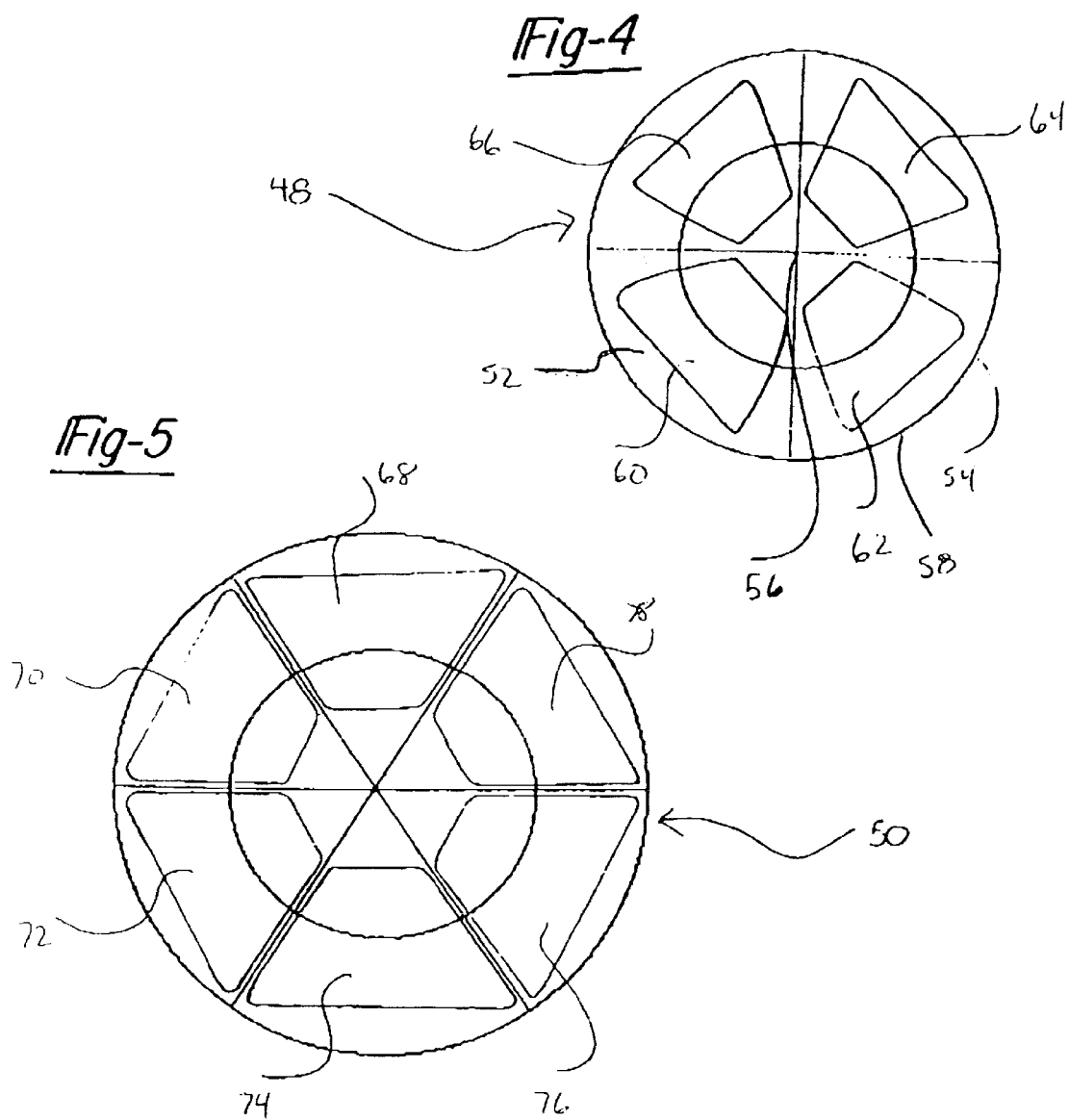

COMBINATION MIRROR AND METHOD FOR PRODUCTION THEREOF

CROSS-REFERENCE TO RELATED APPLICATIONS

This application is a continuation application of U.S. patent application Ser. No. 08/594,698, entitled "COMBINATION MIRROR AND METHOD FOR PRODUCTION THEREOF," filed Jan. 31, 1996, now abandoned, the disclosure of which is incorporated herein by reference.

BACKGROUND OF THE INVENTION

1. Field of the Invention

The present invention relates to mirrors. More particularly, the present invention relates to a mirror lens and assembly for mounting onto a vehicle. Even more particularly, the present invention relates to a mirror lens having a flatter portion and a substantially curved portion which cooperate to increase a user's field of view at the sides of a vehicle.

2. Prior Art

Driving a school bus can be an extremely demanding task. A school bus driver must constantly watch the road to ensure that the bus is not involved in an accident. Additionally, the driver must also keep an eye on the students to ensure that they are behaving properly.

One of the most important tasks of the driver, though, is ensuring the safety of the students as they board and exit the bus. Every year, the National Safety Council reports the occurrence of thousands of school bus accidents. In accidents where a child is injured or killed, it is usually a direct result of being struck by the bus itself while the child is boarding or exiting the bus. During these "critical" periods of time, the bus driver must be checking the exterior of the bus, and more particularly, the sides, and front of the bus. To aid in this process, many differently configured mirrors have been developed.

For example, U.S. Pat. No. 4,804,257 issued Feb. 14, 1989 to Schmidt et alia discloses two separate mirrors attached to a U-shaped bar. The mirrors are externally mounted to a school bus to ensure that the driver can see what is taking place at and around the sides of the bus. The mirrors used are generally denoted as flat mirrors; however, it has been instituted in the art that one of the two separate mirrors may be a circular-based convex mirror which is utilized to provide a larger viewing area for the bus driver.

Additionally, U.S. Pat. No. 5,084,785 teaches an Aspheric Elliptical Paraboloid SAFETY MIRROR which is mountable adjacent the perimeter of a vehicle to expand the field of view of the driver. Although the mirror taught in the '785 patent provides an expanded field of view, it substantially distorts the images reflected therein. This makes the driver's job of processing and understanding the images much more difficult. Also, the field of view provided by a single convex mirror generally is not as great as that afforded by the use of two separate mirrors.

Several problems exist when using two separate mirrors attached to the side of a vehicle, such as a school bus. First, there has to this point always been some amount of overlapping field of view when utilizing a flat mirror in conjunction with a convex mirror. This causes perceptual problems for the driver in that the overlap makes it difficult for the driver to distinguish actual distances of objects. As such, it is difficult for the driver to develop a clear picture of what is being seen. Driver's which use a plurality of mirrors externally mounted to a vehicle, generally, must obtain training to learn how to interpret the size and distance of the objects represented by the images in the mirror.

Also, in using two separate mirrors, one must ensure that each mirror is properly adjusted and that the mirrors are suitably mounted so that they do not excessively vibrate as the vehicle upon which they are mounted travels along. It is to the solution of these problems to which the present invention is directed.

BRIEF SUMMARY OF THE INVENTION

The present invention provides a mirror, the mirror serving to broaden the field of view for a user, the mirror comprising:

(a) a lens having a having a front surface, a rear reflective surface, a first edge, a second edge, a pair of side edges, each of the pair of side edges extending between the first edge and the second edge, a first substantially horizontally oriented arc extending between a midpoint of each of the pair of side edges, a second substantially vertically oriented arc extending between a midpoint of the first edge and a midpoint of the second edge such that the intersection of the first arc and the second arc defines the center of the lens, a first portion of the lens disposed on one side of the first arc and a second portion of the lens disposed on a side of the first arc opposite the first portion, wherein the mirror has a first continuously varying radius of curvature from the first edge to the second edge such that the first radius of curvature of the first portion is always greater than the first radius of curvature of the second portion, and wherein the mirror is substantially symmetric about the second arc; and (b) means for mounting the lens to a surface.

The mirror of the present invention has a first edge and a second edge and two side edges extending therebetween. The mirror has a substantially horizontally aligned arc bisecting and extending between each of the pair of side edges such that the arc defines a first portion and a second portion. The first portion and the second portion are disposed on opposite sides of the horizontal arc.

The two portions are formed integrally with each other and as such there is no overlap of the viewing field and substantially no discontinuity at the intersection thereof. The mirror has a varying radius of curvature normal to the horizontal arc such that a maximum radius of curvature is achieved towards the first edge and a minimum radius of curvature is achieved towards the second edge. Therefore, the first portion of the mirror becomes substantially flat as one approaches the first edge. The second portion becomes increasingly curved or convex as one approaches the second edge.

Formation of the mirror lens is accomplished via constructing an outwardly curved or convex disk formed from the same material as the mirror, having a front surface and a rear reflective surface. The disk is defined as having a base with a diameter D and a height at the center thereof of H. The disk is envisioned as having a diameter/height ratio of at least 2.0. The disk is divided into several sections which are then cut out and smoothed. In this fashion, several mirrors may be generated from one convex disk, depending upon the diameter of the base of the disk.

The mirror assembly of the present invention preferably is mounted onto each front fender of a vehicle. Alternatively, the mirror assembly may be mounted at the driver's side window. The mirror is mounted via well known means for mounting.

Although the mirror assembly is designed to improve the field of view of a driver of a school bus, the mirror assembly can be readily adapted for use on any larger vehicles, including but not limited to cars, station wagons, trucks, trains, recreational vehicles, aircraft, boats, and the like. The mirror itself may be formed from glass, plexiglass, or other materials which are well-known to the skilled artisan.

For a more complete understanding of the mirror surface of the present invention, reference is made to the following detailed description and accompanying drawings in which the presently preferred embodiment of the invention is illustrated by way of example. It is expressly understood, however, that the drawings are for purposes of illustration and description only, and are not intended as a definition of the limits of the invention. Throughout the following description and drawings, like reference numerals refer to like parts in which:

BRIEF DESCRIPTION OF THE SEVERAL VIEWS OF THE DRAWINGS

FIG. 1 is a top view of a mirror lens in accordance with the present invention;

FIG. 2 is a cross-sectional view of the mirror lens of FIG. 1 taken along line 2—2;

FIG. 3 is a cross-sectional view of the mirror lens of FIG. 1 taken along line 3—3;

FIG. 4 is a top plan view of a mirrored dish containing a plurality of mirror lenses in accordance with the present invention prior to their separation;

FIG. 5 is a top plan view of a mirrored dish containing a plurality of mirror lenses in accordance with the present invention prior to their separation;

DETAILED DESCRIPTION OF THE INVENTION

Figure 7:
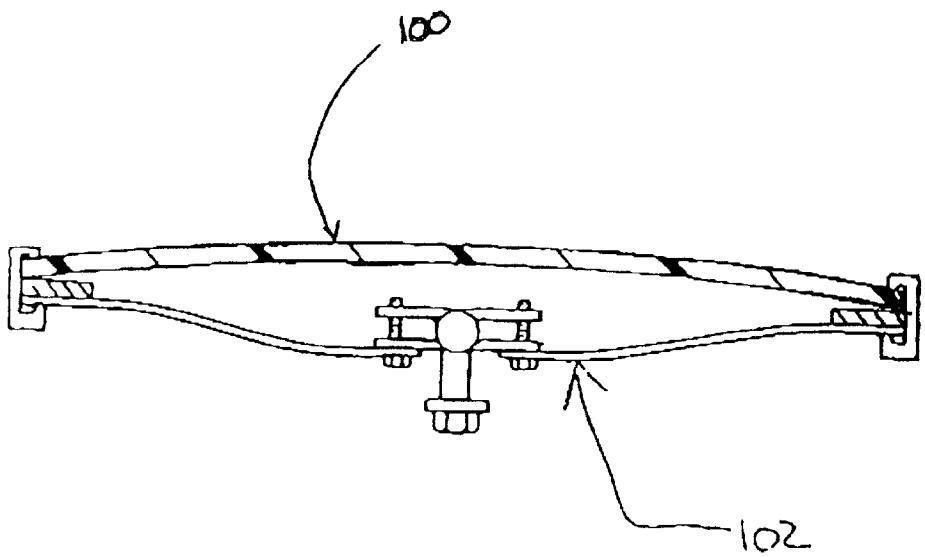
FIG. 7 is a cross-sectional view of the mirror lens of the present invention attached to a mounting plate.

Referring now to FIGS. 1–3 there is depicted therein a mirror lens which is constructed in accordance with the principles of the present invention, and is generally denoted at 10. The mirror lens has a substantially transparent front surface 12 and a rear reflective surface 14. In the preferred embodiment, the transparent front surface 12 is made of acrylic plastic although similar transparent materials such as glass may be used in practicing the invention. The transparent surface is also preferably, by way of non-limiting example, approximately 0.125 inches thick although it may be thinner or thicker depending upon the intended use of the mirror.

The rear surface 14 has a reflective coating 15 disposed thereupon. Such a reflective coating may be applied as a paint or other similar coating or may be a metal foil, all of which are well known to the skilled artisan. Additionally, methods for applying a reflective coating onto a mirror lens, such as that of the present invention, are well known.

The mirror lens 10 has a first edge 16, a second edge 18, and a pair of side edges 20, 22 extending between the first edge 16 and the second edge 18. The mirror lens 10 has a first arc x which extends between and bisects each of the pair of side edges 20, 22. The mirror lens 10 has a second arc y which extends between and bisects each of the first edge 16 and the second edge 18. Therefore, the intersection of arc x and arc y defines the center 24 of the mirror lens 10.

The mirror lens 10 has a first mirror portion or segment 26 bounded by the first edge 16, the first arc x and each of the pair of side edges 20, 22. The mirror lens 10 has a second mirror portion or segment 28 bounded by the second edge 18, the first arc x and each of the pair of side edges 20, 22. A third mirror portion or segment 30 is bounded by the first edge 16, the second edge 18, a side edge 20 and the second arc y. And a fourth mirror portion or segment 32 is defined by the first edge 16, the second edge 18, the second arc y and a side edge 22.

It is to be appreciated that the mirror lens 10 is partially outwardly curved, or convex, as will be described further hereinbelow, and has a varying radius of curvature as one travels along the second arc y from the first edge 16 to the second edge 18. In the preferred embodiment, the radius of curvature is at a maximum at the first edge 16 and continuously regularly decreases to a minimum at the second edge 18. As such, the mirror lens 10 is flatter at the first edge 16 and more curved at the second edge 18. Therefore, the mirror lens 10 is not symmetric about the first arc x. Additionally, the first mirror portion 26 and the second mirror portion 28 are not identical, as the first mirror portion 26 will always have a larger radius of curvature than the second mirror portion 28. The mirror lens 10 is, however, substantially symmetric about the second arc y. As such, the third mirror portion 30 and the fourth mirror portion 32 are substantially identical.

While the mirror lens 10 of the present invention has a varying radius of curvature along the second arc y, the radius of curvature along the first arc x is constant. As depicted in FIG. 2, tangents 34 to the mirror lens 10 taken along the first arc x at regular intervals are substantially equal, thus indicating a constant curve to the arc x. Concomitantly, and as shown in FIG. 3, tangents 36, 38, 40, 42, 44 and 46 to the mirror lens 10 taken along the second arc y vary, and indicate that the mirror lens 10 is much flatter towards the first edge 16 and more curved or convex towards the second edge 18.

Although the radius of curvature of the lens 10 is constant along the first arc x, the radius of curvature of arcs taken parallel to the first arc x will vary proportionately with the change in the radius of curvature along the second arc y. For example, at the first edge 16, the radius of curvature of the lens 10 along the second arc y is comparatively large, and is actually a maximum thereat. As such, the radius of curvature of an arc taken normal to the second arc y at the first edge 16 will have a larger radius of curvature than the first arc x. At the second edge 18, the radius of curvature of the lens 10 along the second arc y is comparatively small (indicating a more convex curve to the lens 10), and is actually a minimum thereat. As such, the radius of curvature of an arc taken normal to the second arc y at the second edge 18 will have a smaller radius of curvature. In this fashion, the mirror lens 10 is substantially flatter at the first edge 16 and substantially more curved or convex at the second edge 18. The convexness of the lens 10 continuously increases as one travels from the first edge 16 towards the second edge 18.

Although the flatter first mirror portion 26 of the mirror is depicted as encompassing the top half of the mirror; it must be appreciated that variance of the radius of curvature along the second arc y may be selected so that the flatter portion 26 of the mirror comprises most of the mirror or only a small portion thereof. As a non-limiting example, and in the preferred embodiment, the curve of the lens surface along the second arc y may be represented by a curved line segment defined by the seventh order, sixth degree equation where V represents a distance along a vertical axis and H represents a distance along a horizontal axis, thusly:

$$V=3.72+0.06989H-0.3349H2+0.21664H3-0.20723H4+0.060985H5-0.0067937H6$$

This equation is taught in U.S. Pat. No. 4,436,372 which is incorporated herein by reference. Of course, this example merely defines one curve which may be employed in accordance with the present invention.

As has been described hereinabove, the variance of the radius of curvature of any two arcs taken parallel to the first arc x along the mirror surface will be proportional to the variance of the radius of curvature along the second arc y taken at points along each of the two parallel arcs which are both normal the second arc y.

As shown in FIGS. 1–3, the mirror lens 10 is generally narrower at the first edge 16 while outwardly tapering or widening as one travels towards the second edge 18. Therefore, the first mirror portion 26 is narrower than the second mirror portion 28. In the preferred embodiment, and as a means of non-limiting example, the first edge 16 may have a width of between 5 and 12 inches, while the second edge 18 may have a width of between 7 and 20 inches.

The second mirror portion 28 is, generally, wider than the first mirror portion 26 to provide a greater field of view thereat. This is enhanced by the fact that the second mirror portion 28 is always more curved or convex than the first mirror portion 26. Because the second mirror portion 28 is wider, the field of view is dramatically increased. As such, the preferred embodiment of the lens 10 in accordance with the present invention provides the advantages of both a flat mirror and a wide convex mirror in one lens. This has heretofore not been accomplished in the art.

Additionally, as vehicles or pedestrians approach the mirror lens 10, the image in the lens representing the vehicle or pedestrian tracks from the top of the mirror lens 10 towards the bottom thereof. As such, the image travels from the flatter portion to the more curved portion. Therefore, images in the lens will not take up the entire field of view as the object approaches the lens. For example, an image of a vehicle approaching the lens will appear at the top of the lens 10. As the vehicle comes closer and closer to the lens, its image will move down the lens into the more curved portion. As such, the image size will not increase as dramatically, and will actually end up in the lower left corner of the lens. This is highly advantageous because the mirror lens will still be useful even when a vehicle or some other object is very close to the lens. Heretofore, no mirror lens has been known that accomplishes the hereinabove mentioned function.

It is to be appreciated, however, that the second mirror portion 28 may be equal in area or width to the first mirror portion 26. The second mirror portion 28 additionally may be narrower than the first mirror portion 26 as well, although this is not preferred because the second portion 28 is more curved and so increasing the width thereof provides a much greater field of view than increasing the width of the first mirror portion 26.

A second aspect of the present invention is the method for forming the lens 10. The mirror lens 10 is preferably cut from a relatively large circular based outwardly curved or convex mirrored disk or dish 48, 50, such as those depicted in FIGS. 4 and 5. As can be seen in the drawings, the size of the convex dish 48, 50 is determinative of how many mirror lenses may be cut therefrom. Because the only substantial difference between the dishes 48 and 50 is their relative size, reference will be made herein only to dish 48.

Dish 48 has a transparent front surface 52 and a rear reflective surface 54. As hereinabove described, reflective coatings and means for applying such coatings to a mirror are well known in the art. The dish 48 additionally has a centrally defined apex 56. The dish 48 additionally, and preferably, has a diameter of about forty inches and a height at its apex of approximately five inches. However, the dish may have any diameter and height as long as the ratio of diameter to height should generally never be less than 2.0 to practice the present invention. The convex dish is formed with a varying radius of curvature as one radially travels from the apex 56 to the periphery 58 of the disk. The hereinabove mentioned equation depicts a curve satisfying this requirement.

Figure 6:
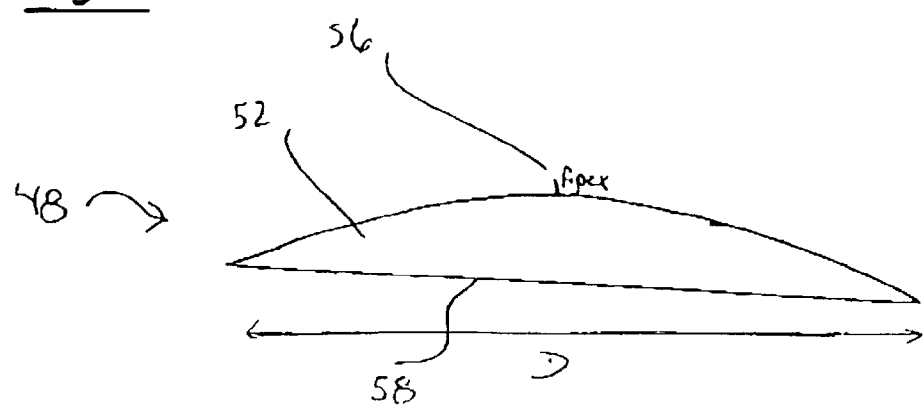
FIG. 6 is a side view of a disk in accordance with the present invention.

In the preferred embodiment of the second aspect of the present invention, and as shown in FIG. 6, the radius of curvature of the dish 48 may approach infinity at its apex 56. The radius of curvature continuously decreases as one travels from the apex to the periphery of the dish 48. It is to be appreciated that the radius of curvature of the dish 48 regularly varies to ensure that there is no discontinuity in the surface thereof. Discontinuities in a mirror cause distortion of images formed therein and it is the avoidance thereof to which the present invention is directed.

Means for forming an outwardly curved or convex mirrored dish are well known by the skilled artisan. Once the convex dish 48 is formed, several lenses, such as that disclosed hereinabove, may be cut from the dish. FIGS. 4 and 5 depict lenses that may be cut from a convex dish 48, 50 having the properties described hereinabove. Means for cutting a lens 60–78 from a larger mirrored surface are well known and include the use of glass cutters or the like.

Although the preferred embodiment of the second aspect of the present invention is disclosed herein, it must be appreciated that the lens 10 may be formed from a substantially flat mirror as well, although this is neither preferred nor extremely feasible. As an example, a flat mirror may be heated and bent into the configuration of the lens 10. However, this may be an extremely difficult task as there should be no discontinuity between the flatter portion 26 of the lens 10 and the substantially curved portion 28 of the lens 10.

Additionally, the dish 48, 50 does not necessarily have to have the reflective surface deposited thereon prior to the cutting of the lenses 60–78 therefrom. The reflective surface may be applied to the lenses subsequent to removal from the dish 48, 50.

FIG. 7 shows a lens 100 in accordance with the present invention secured by and housed within a mount 102, such that the lens 100 may be mounted to a vehicle. Although a preferred embodiment of the mount 102 is depicted herein, it is to be appreciated that any configuration of mount may be employed depending upon the location of placement and the purpose which the lens 100 is to serve. One such mount is disclosed in U.S. Pat. No. 4,830,326 the disclosure of which is incorporated by reference herein.

The lens 10 of the present invention provides a single mirror lens having both a substantially flatter portion and a substantially curved portion with no substantial discontinuity or distortion between the two. Additionally, and as opposed to the previous practice of using separate lenses to provide a flat and convex mirror surface, there is no overlap in the field of view in the lens 10. As such, it is much easier to comprehend the relationship of distances and relative locations of objects represented by the images in the mirror. Also, one does not have to worry about adjusting two different mirrors to provide a proper field of view; in the instant case, only one mirror has to be adjusted. Also, it is much easier to ensure that one mirror does not develop unwanted vibrations while the vehicle to which it is attached travels over rough terrain, as opposed to dampening the vibrations of two separate mirrors.

As will be realized, the invention is capable of other and different embodiments and its several details are capable of modifications in various obvious respects, all without departing from the invention. Accordingly, the drawings and descriptions are to be regarded as illustrative in nature and not as restrictive.

Having thus described the invention,

What is claimed is:

1. A mirror lens for exteriorly mounting onto a vehicle, the mirror lens serving to broaden the field of view for a driver, the mirror lens comprising:

a front surface, a rear reflective surface, a first edge, a second edge, a pair of side edges extending between the first edge and second edge, a first substantially horizontally oriented arc extending between a midpoint of each of the pair of side edges and having a constant radius of curvature, a second substantially vertically oriented arc extending between a midpoint of the first edge and a midpoint of the second edge such that the intersection of the first arc and the second arc defines the center of the lens, a first portion of the lens disposed on one side of the first arc and a second portion of the lens disposed on a side of the first arc opposite the first portion, and wherein the mirror has a first continuously varying radius of curvature from the first edge to the second edge such that the first radius of curvature of the first portion is always greater than the first radius of curvature of the second portion, and further wherein the mirror is substantially symmetric about the second arc, and further wherein the first portion is narrower than the second portion, the lens having a substantially trapezoidal configuration.

2. The mirror lens of claim 1 wherein the lens has a maximum radius of curvature at the first edge thereof.

3. The mirror lens of claim 1 wherein the lens has a minimum radius of curvature at the second edge thereof.

4. The mirror lens of claim 1 wherein the first radius of curvature of the first portion is always less than infinity.

5. The mirror lens of claim 1 further comprising a means for mounting the lens to a surface.

6. A method for forming the mirror lens of claim 1 comprising the steps of:

(a) forming an outwardly curved mirror dish having a periphery and an apex, the dish having a varing radius of curvature from the apex to the periphery; and (b) cutting a plurality of lenses from the dish such that the narrower first portion is proximate the apex of the dish and the wider second portion is proximate the periphery of the dish.

7. A mirror lens for exteriorly mounting onto a vehicle, the mirror lens serving to broaden the field of view for a driver, the mirror lens comprising:

a front surface, a rear reflective surface, a first edge, a second edge spaced apart from the first edge, a pair of side edges, each of the pair of side edges extending between the first edge and the second edge, the pair of side edges tapering outwardly from the first edge to the second edge such that the first edge is narrower in width than the second edge, the first edge, the second edge and the pair of side edges cooperating to define a substantially trapezoidally configured lens; a first substantially horizontally oriented arc extending between a midpoint of each of the pair of side edges and having a constant radius of curvature, a second substantially vertically oriented arc extending between a midpoint of the first edge and a midpoint of the second edge such that the intersection of the first arc and the second arc defines the center of the lens, a first portion of the lens disposed on one side of the first arc and second portion of the lens disposed on a side of the first arc opposite the first portion, and wherein the mirror has a first continuously varying radius of curvature from the first edge to the second edge such that the first radius of curvature of the first portion is always greater than the first radius of curvature of the second portion, and further wherein the mirror is substantially symmetric about the second arc, and wherein each of a plurality of arcs taken parallel to the first arc and normal to the second arc has a constant radius of curvature.

8. The mirror lens of claim 7 which further includes a second plurality of arcs, the second plurality of arcs being parallel to the first arc and normal to the second arc, each one of the second plurality of arcs has a different radius of curvature from each other such that the variance between the radius of curvature of each of the second plurality of arcs is directly proportionate to the variance of the radius of curvature of the second arc taken at points where each of the second plurality of arcs crosses the second arc.

9. A method for forming the mirror lens of claim 7 comprising the steps of:

(a) forming an outwardly curved mirrored dish having a periphery and an apex, the dish having a varying radius of curvature from the apex to the periphery; and (b) cutting a plurality of lenses from the dish such that each lens has a narrower first portion proximate the apex and a wider second portion proximate the periphery of the dish.

10. The mirror lens of claim 7 wherein the first radius of curvature of the first portion is always less than infinity.

11. The mirror lens of claim 7 further comprising a means for mounting the lens to a surface.

* * * * *